US005625424A

United States Patent [19]
Conner et al.

[11] Patent Number: 5,625,424
[45] Date of Patent: Apr. 29, 1997

[54] DIGITAL MOTOR CONTROLLER FOR COLOR WHEEL

[75] Inventors: James L. Conner, Rowlett; Joseph G. Egan, Garland; William R. Breithaupt, Dallas, all of Tex.

[73] Assignee: Texas Instruments Incorporated, Dallas, Tex.

[21] Appl. No.: 339,373

[22] Filed: Nov. 14, 1994

[51] Int. Cl.⁶ .................................................. H04H 9/12
[52] U.S. Cl. ........................ 348/743; 318/807; 318/811
[58] Field of Search .................................. 348/739, 471, 348/474, 476, 516, 743, 742, 536, 551, 270, 271; 318/638, 618, 7, 8, 568.25, 594, 599, 600, 603, 615, 616, 684, 675, 45, 34, 799, 65, 811–815, 439, 807–810; H04N 5/66, 9/12, 7/13, 7/08, 7/087, 7/093, 9/475

[56] References Cited

U.S. PATENT DOCUMENTS

| | | | |
|---|---|---|---|
| 4,843,288 | 6/1989 | Volz et al. | 318/599 |
| 4,896,244 | 1/1990 | Kalina | 361/98 |
| 5,057,753 | 10/1991 | Leuthold et al. | 318/254 |
| 5,350,988 | 9/1994 | Le | 318/618 |
| 5,365,283 | 11/1994 | Doherty et al. | 348/743 |
| 5,428,285 | 6/1995 | Koyama et al. | 318/799 |

*Primary Examiner*—Michael Lee
*Attorney, Agent, or Firm*—Julie L. Reed; James C. Kesterson; Richard L. Donaldson

[57] ABSTRACT

A digital motor controller (17) for controlling both the phase and speed of a brushless DC motor (16). An error detection unit (21) detects a speed error or a phase error. An error logic unit (22) uses the error to determine a speed control value, that is proportional to represent an average motor input voltage that varies from the current input voltage by an amount determined by the error. A pulse width modulation unit (23) receives the speed control value and uses it to determine the duty cycle for the motor drive signals. A commutation unit (24) modulates the appropriate drive signal, and a drive stage (27) delivers the drive signals to the motor (16).

14 Claims, 4 Drawing Sheets

DIGITAL MOTOR CONTROLLER FOR COLOR WHEEL

TECHNICAL FIELD OF THE INVENTION

This invention relates to image display systems, and more particularly to a controller for a color wheel used in an image display system.

BACKGROUND OF THE INVENTION

Image display systems based on spatial light modulators (SLMs) are an alternative to image display systems that are based on cathode ray tubes (CRTs). SLM systems provide high resolution without the bulk of CRT systems.

Digital micro-mirror devices (DMDs) are one type of SLM, and may be used for either direct view or for projection displays. A DMD has an array of hundreds or thousands of tiny tilting mirrors, each of which represents one pixel. To permit the mirrors to tilt, each is attached to one or more hinges mounted on support posts, and spaced by means of an air gap over underlying control circuitry. The control circuitry provides electrostatic forces, which cause each mirror to selectively tilt. For display applications, image data is loaded to memory cells of the DMD and in accordance with this data, mirrors are tilted so as to either reflect light to, or deflect light from, the image plane.

One approach to providing color images in an SLM display system is to alternately address all pixels of a frame of the image with a different color. For example, each pixel might have a red, a green, and a blue value. Then, during each frame period, the pixels of that frame are addressed with their red, blue, then green data, alternatingly. A color wheel having three segments of these same colors is synchronized to the data so that as the data for each color is displayed by the SLM, the light incident on the SLM is filtered by the color wheel. For standard display rates of 60 images per second, the eye perceives the image as having the proper color.

To permit each pixel to be represented by values with more than one bit for each color, various modulation schemes can be used to vary the intensity of each color. For example, each pixel might have a 24-bit value, 8 bits for each color. This permits $2^8=256$ levels of intensity for each color.

SUMMARY OF THE INVENTION

One aspect of the invention is a digital motor controller for controlling the speed and phase of a color wheel having a brushless DC motor. An error detection unit receives an index signal, which is comprised of pulses that each indicate a current position of the color wheel. It compares the phase of the index signal to the phase of a reference signal, or it compares the period of the index signal to the period of a reference signal, thereby determining an error value. An error logic unit receives the error value and uses it to calculate a speed control value. A pulse width modulation unit generates a modulation signal based on the speed control value. A commutation logic unit modulates the pulse width of a drive signal to the motor in accordance with the modulation signal. Drive stage circuitry, such as level shifters and power amplifiers, may also be included in the same motor controller device.

An advantage of the invention is that it is an all-digital design. The design permits logic circuitry for controlling both speed and phase of the motor, as well as circuitry for power amplification, to be combined as an integrated circuit on a single chip. This is in contrast to other controllers for brushless DC motors, which are implemented with multiple chip devices and may be partly analog. Also, existing brushless motor controllers are not designed to control phase as well as speed.

DETAILED DESCRIPTION OF THE INVENTION

Display System Overview

The following description is in terms of a display system that displays images generated by an SLM. However, the invention is not limited to SLM-based displays or even to display systems. In fact, a color wheel controller in accordance with the invention is useful for any application in which both speed and phase of the color wheel must be regulated.

Figure 1:
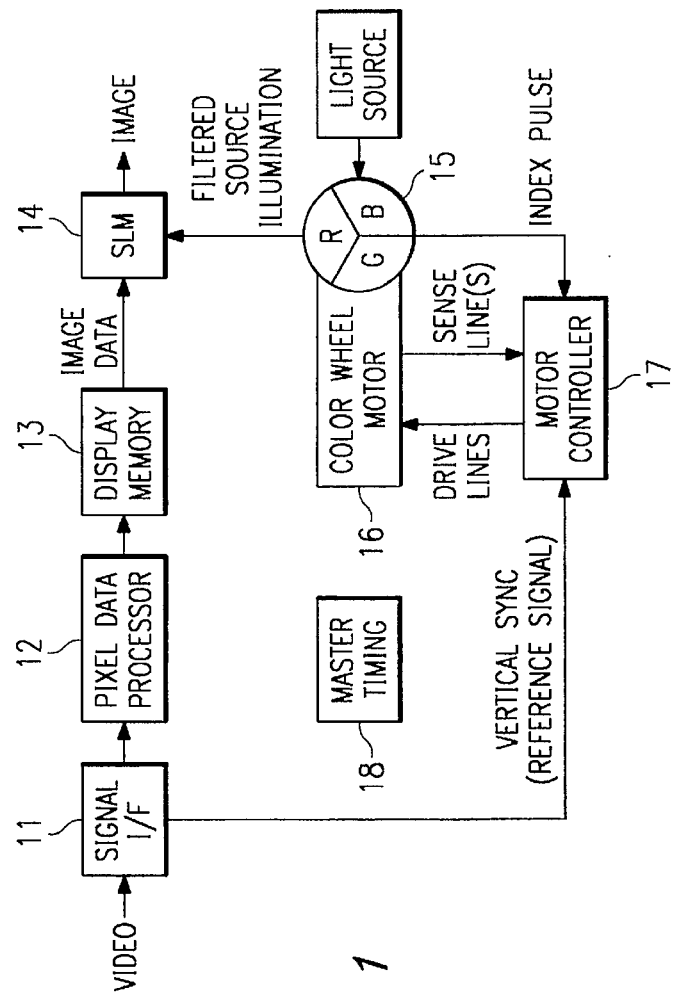
FIG. 1 is a block diagram of a display system having a color wheel motor controller in accordance with the invention.

FIG. 1 is a block diagram of a typical SLM-based image display system 10 that uses a color wheel 15, also having a color wheel motor 16 and a motor controller 17. In accordance with the invention, the color wheel motor controller 17 is an all-digital device. It controls both speed and phase, and can use a single index signal to determine both speed and phase error. For purposes of this description, the motor "phase" is its position with respect to a reference signal, which permits the color wheel to be synchronized to the data currently being displayed.

The following overview of the various components of display system 10 provides details helpful to understanding of the invention. Further details pertaining to a DMD-based image display system with other types of color wheel systems are set out in U.S. Pat. No. 5,079,544, entitled "Standard Independent Digitized Video System", and in U.S. Pat. Ser. No. 08/146,385, entitled "DMD Display System". Each of these patents is assigned to Texas Instruments, and each is incorporated herein by reference.

Signal interface 11 receives some kind of input signal. For purposes of example herein, it will be assumed that the input signal is a standard video signal having horizontal and vertical synchronization components. As explained below, the vertical synchronization signal is used as a reference signal to adjust the speed of the color wheel 15. However, in other systems, the input signal might be graphics data and the reference signal could come from some other source.

In the case of a video input signal, interface 11 separates the video signal from synchronization and audio signals. It includes an A/D converter and a Y/C separator, which convert the data into pixel data samples and separate the luminance data from the chrominance data. The signal could be converted to digital data before Y/C conversion or Y/C separation could occur before digitization.

Pixel data processor 12 prepares the data for display, by performing various processing tasks. Processor 12 includes processing memory for storing pixel data during processing. The tasks performed by processor may include linearization, colorspace conversion, and line generation. Linearization removes the effect of gamma correction, which is performed on broadcast signals to compensate for the non-linear operation of CRT displays. Colorspace conversion converts the data to RGB data. Line generation can be used to convert interlaced fields of data into complete frames by generating new data to fill in odd or even lines. The order in which these tasks are performed may vary.

Display memory 13 receives processed pixel data from processor 12. Display memory 13 formats the data, on input or on output, into "bit-plane" format and delivers the bit-planes to SLM 14. The bit-plane format provides one bit at a time for each pixel of SLM 14 and permits each pixel to be turned on or off accordance to the value of that bit. For example, where each pixel is represented by 8 bits for each of three colors, there will be 3×8=24 bit-planes per frame. In a typical display system 10, memory 13 is a double-buffer memory, which means that it has a capacity for at least two display frames. The buffer for one display frame can be read out to SLM 14 while the buffer or another display frame is being written. The two buffers are controlled in a "ping-pong" manner so that data is continuously available to SLM 14.

SLM 14 may be any type of SLM. For purposes of example, this description is in terms of a display system whose SLM is a digital micro-mirror device (DMD). However, the same concepts apply to display systems that use other types of SLMs. Any SLM that generates an image using source illumination filtered by means of a color wheel is suitable.

The light incident on SLM 14 is transmitted through a rotating color wheel 15. As explained in the Background, the data for each color are sequenced and the display of the data is synchronized so that the portion of color wheel 15 through which light is being transmitted to SLM 14 corresponds to the data being displayed. In the example of this description, each pixel is represented by an RGB data value, which means that each pixel has a red value, a green value, and a blue value. As the values for each color of all pixels in a frame are being displayed, color wheel 15 rotates so that the light is tansmitted through the corresponding red, blue or green filter. The combination of these three values results in the desired color for each pixel.

Color wheel 15 is driven by a motor 16, which is a brushless DC motor. Typically, motor 16 is multi-phase, and in the example of this description, is a three-phase motor.

Motor controller 17 controls the speed and phase of color wheel 15 by providing appropriate drive signals to motor 16. For example, the desired speed might be 60 revolutions per second to correspond to a 60 frame per second display rate. The phase is set so that the proper filter (red, green, or blue) of color wheel 15 is transmitting light from SLM 14 as the data for that filter is being displayed. Depending on the drive signals, motor 16 can change its speed and it can speed up or slow down until its phase is correct.

As explained below, to determine the proper speed and phase, controller 17 receives a reference signal. Controller 17 also receives one or more feedback signals to determine speed error and phase error. In the example of FIG. 1, an index signal from color wheel 15 is used to obtain both speed error and phase error. In other embodiments, speed is determined from other feedback signals. Controller 17 also receives one or more sense signals from motor 16 for commutation timing.

Master timing unit 18 provides various system control functions. In alternative designs, it might generate the reference signal that is delivered to controller 17 and is used to set the speed and phase of color wheel 15.

Motor Controller

Figure 2:
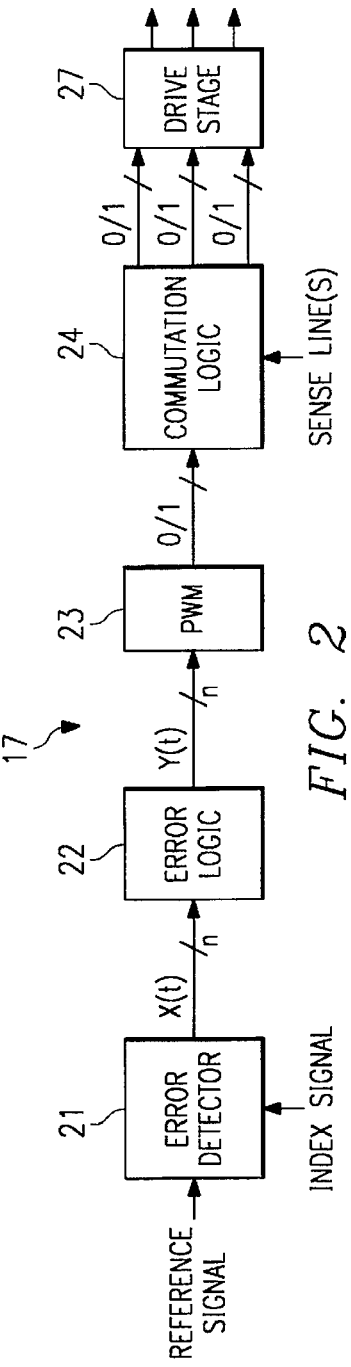
FIG. 2 is a block diagram of the motor controller of FIG. 1.

FIG. 2 is a block diagram of motor controller 17. In general, controller 17 is designed for a pulse width modulation approach to speed control. Thus, speed control is obtained by modulating the "on" and "off" times of the drive signals to motor 16. As explained below, an all-digital data path, which begins with a error detector 21, results in a "chop" pulse that modulates the "on" pulse of the appropriate drive signal output from drive stage 27.

The basic function of error detector 21 is to compare reference phase and speed data with data obtained from a phase feedback signal and a speed feedback signal. The comparison provides either a phase error value or a speed error value. Both error values represent how much the duty cycle of the pulse width modulated drive signal should be lengthened or shorten so as to make motor 16 speed up or slow down.

Accordingly, error detector 21 receives a reference signal, which sets a desired speed and phase of color wheel 15. In the example of this description, the reference signal is the vertical sync signal of a standard television signal. Its pulses occur at a rate of approximately 60 fields per second, which corresponds to a rate of 60 revolutions per second of color wheel 15. The sync pulse sets phase by providing a reference time with respect to which a certain location on color wheel 15 should be at a certain place. For example, phase could be set in terms of when the first border of the red portion of color wheel 15 is at position x at t seconds after a vertical sync pulse.

Error detector 21 also receives an index signal from color wheel 15. In the example of this description, the index signal is a single pulse per revolution, which indicates the position of a known location on color wheel 15. As explained below, this index signal is the phase feedback signal, and can also be used as the speed feedback signal.

Figure 3A:
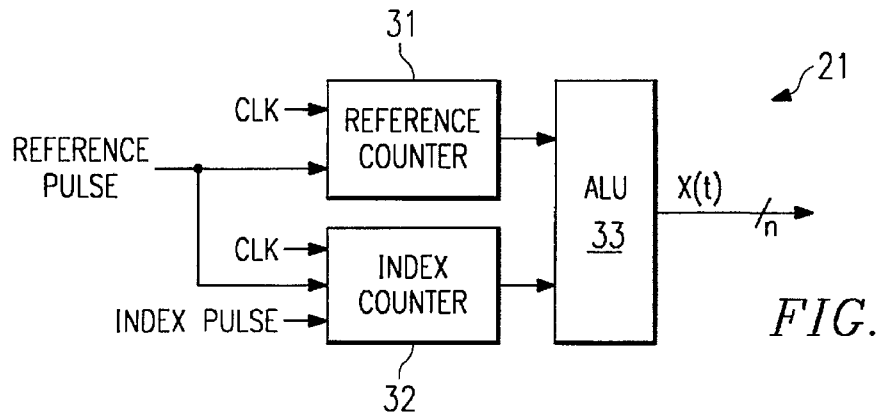
FIGS. 3A and 3B are block diagrams of alternative embodiments of the error detector of FIG. 2.

FIG. 3A illustrates one implementation of an error detector 21, which uses the index signal to determine both speed error and phase error. It is comprised of two counters 31 and 32 and a comparator 33. Both counters 31 and 32 receive the same clock signal.

For detecting speed error, error detector 21 compares the period of the index pulse to the period of the reference pulse. Specifically, reference counter 31 counts the number of clock pulses between two vertical sync pulses. At the same time, index counter 32 counts the number of clock pulses between two index pulses. ALU 33 determines the difference between these two counts. It delivers an n-bit error value, x(t), to logic unit 22.

For detecting phase error, the desired phase is represented by some predetermined time difference between the reference pulse and the index pulse. The reference pulse is used to set index counter 32 to 0. Then, counter 32 counts until it receives the index pulse. This count is delivered to ALU 33, which determines the difference between the desired phase and the actual phase, and delivers an n-bit error value, x(t), to error logic unit 22. For example, the index pulse might be desired to coincide with the reference pulse. Thus, counter 32 should count an entire revolution if the two signals are in phase. Otherwise, the count of counter 32 would represent a phase error.

In operation, during an initial motor start-up, color wheel 15 is brought to a speed that approximates the desired speed. Then, any speed error is detected, until the index count per revolution is the same as the reference count per revolution. Then, a phase lock is performed during which any error between the index position and the reference position is detected.

Figure 3B:
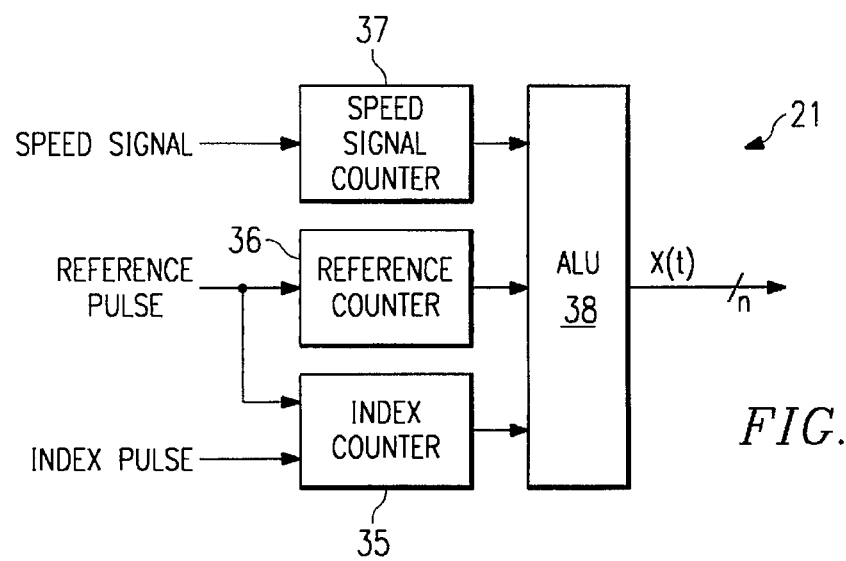

FIG. 3B illustrates an alternative embodiment of error detector 21. In this embodiment, speed error and phase error are determined from separate feedback signals. Phase error is determined in a manner similar to that of the error detector 21 of FIG. 3A, where the reference pulse resets an index counter 35 and the number of counts is related to a desired phase by ALU 38. Speed error is determined by a speed feedback signal other than the index signal. For example, the back emf of motor 16 might be used to indicate speed. If motor 16 generates n pulses per revolution, the time between every nth pulse could be counted and compared to the time between every reference pulse. Counters 36 and 37 and ALU 38 are used for this purpose, and additional logic might be required depending on the type of speed feedback being used.

Referring again to FIG. 2, error logic unit 22 receives the error value, x(t), from error detector 21. The operation performed by error logic unit 22 is a feed-forward accumulation function that calculates a value proportional to the desired average voltage to the color wheel motor 16. Thus, where the error signal, x(t), is a positive value representing a change in the duty cycle of the motor drive signal, the speed control signal, y(t), represents the desired duty cycle. For example, it might be known that a duty cycle of ½ the drive signal period results in an average voltage to motor 16 of V volts and a desired speed of 60 revolutions per second. If the motor 16 is going too fast, the speed control value would represent a shorter duty cycle, whereas if motor 16 is going too slow, the speed control value represent a longer duty cycle.

Figure 4:
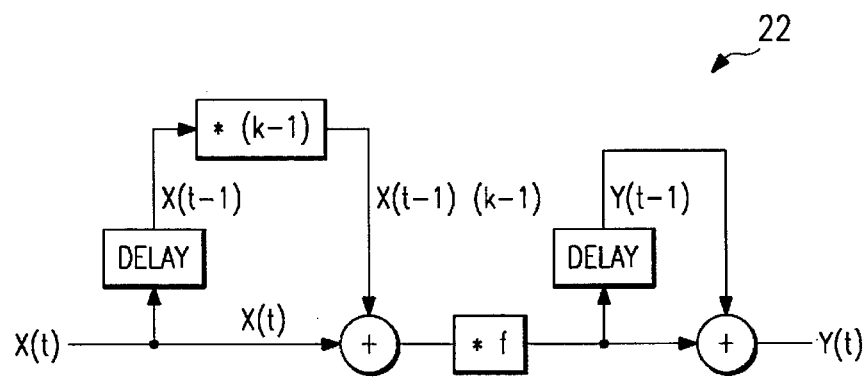
FIG. 4 is a functional block diagram of the error logic unit of FIG. 2.

FIG. 4 illustrates an example of a logic function performed by error logic unit 22, where the function is described by the following algorithm:

$$y(t) = f * [x(t) + (k-1) * x(t-1)] + y(t-1)$$

The values f and k are constants determined by various factors related to the load. These factors include the constant of proportionality relating to motor operating frequency, the response of the motor, the gain of the power amplifier, and the break frequency of the motor. Preferably, the f and k constants are programmable for varying loads. The error value, x(t), is the current error value received from error detector 21. The values x(t−1) and y(t−1) are stored from the previous calculation. The output of logic unit 22, y(t), is a digital speed control value.

Referring again to FIG. 2, pulse width modulation (PWM) unit 23 receives the digital speed control value, y(t). In general, PWM unit 23 generates on/off signals that "chop" the high motor drive pulses. The result is an average output voltage that determines the motor speed.

Figure 5:
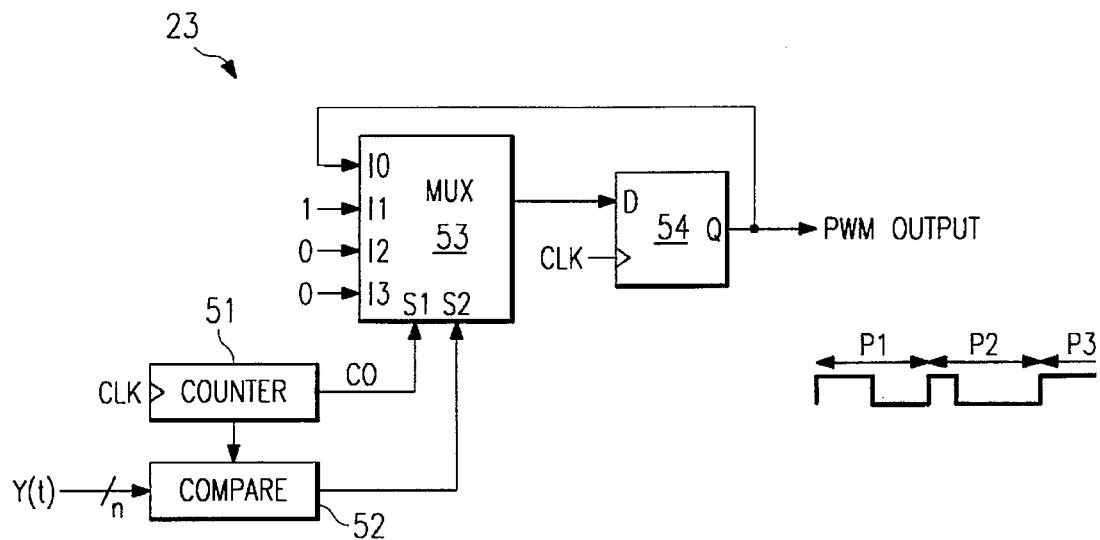
FIG. 5 is a block diagram of the pulse width modulation unit of FIG. 2.

FIG. 5 illustrates PWM unit 23. A counter 51 counts clock pulses sequentially, in a cycle, to set a pulse width switching frequency. For example, a clock frequency might be 20 MHz, with counter 51 designed to saturate and return to zero at intervals of 400 counts, so as to set up a motor switching frequency of 50 KHz. The clock frequency count of counter 51 is delivered to comparator 52, which compares it to the value received from error logic unit 22. If a match is made, comparator 52 switches state. A carryout from counter 51 and the output of comparator 52 are delivered to the select inputs, S1 and S2, of multiplexer 53. Depending on the values of these inputs, one of four multiplexer inputs, I0–I4, is passed as the output of multiplexer 53. Input I0 passes the previous output. Input I1 passes a 1 value. Inputs I2 and I3 pass a 0 value. A latch 54 holds the previous value and delivers it back to multiplexer 53. The output of PWM unit 23 is delivered to commutation logic unit 25.

In operation, for each period of the drive signal to motor 16, the "on" time is held at the beginning of each period until comparator 52 detects a match. At this point, the drive signal goes low until counter 51 counts through the rest of the period. It then goes high again at the beginning of the next period, etc. In FIG. 5, the output of PWM unit 23 is depicted with three drive signal periods, P1, P2, and P3. During P1, the motor will receive the target voltage. During P2 the motor will slow down, and during P3 the motor will speed up.

Referring again to FIG. 2, commutation logic unit 24 determines which drive signal is to be modulated. To this end, commutation logic unit 24 receives input that indicates the present location of the rotor of motor 16. In the example of this description, this is accomplished with Hall effect sense lines. Alternatively, the back emf of motor 16, as generated by the windings, could be detected on each of the drive lines and compared to the voltage on a center tap from motor 16. Commutation logic unit 24 also receives a motor direction input, which is typically either hardwired or controlled with an externally obtained control signal.

Figure 6:
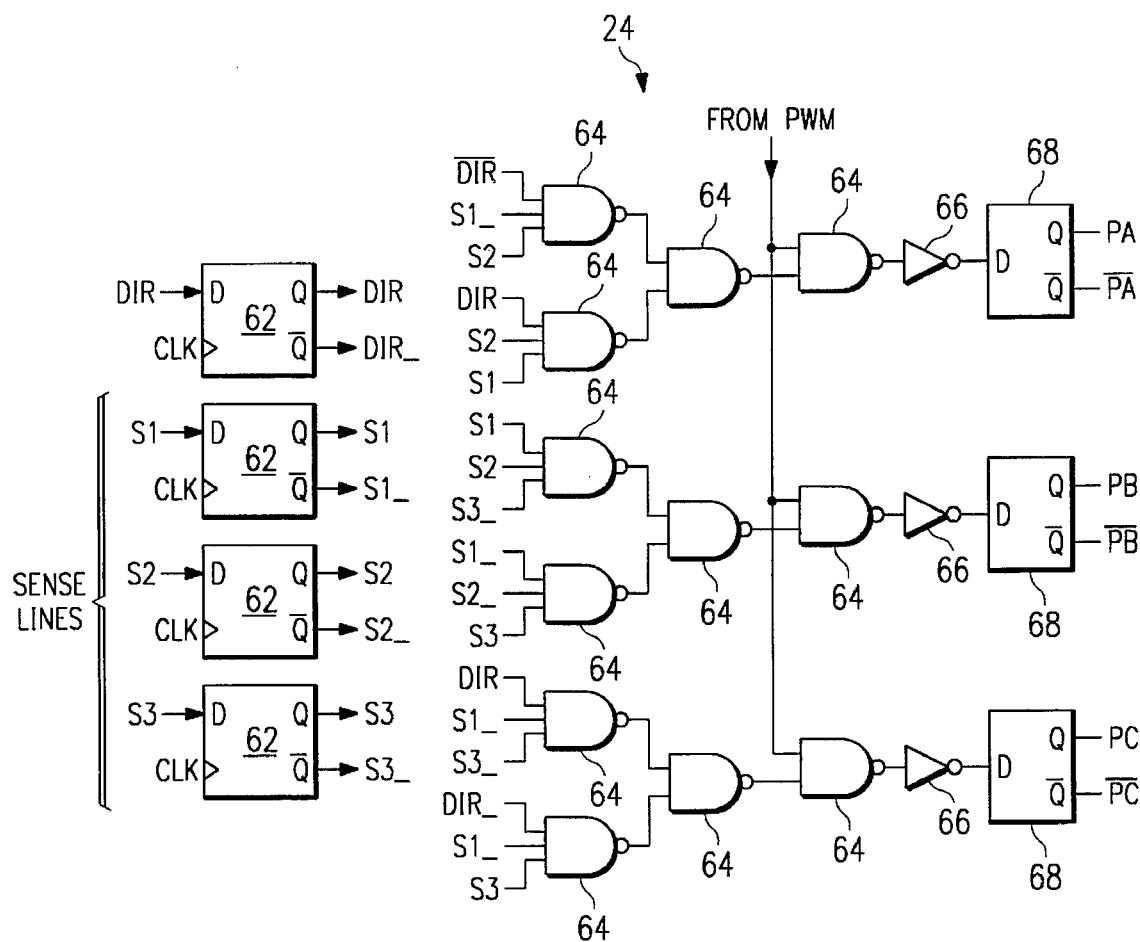
FIG. 6 is a block diagram of the commutation logic unit of FIG. 2.

FIG. 6 illustrates one embodiment of a commutation logic unit 24, which uses three Hall effect sense signal inputs, S1–S3. Four D flip-flops 62 each receive a sense signal or a direction signal. These D flip-flops 62 output positive and negative position state values. A set of logic gates 64 "NAND" the output of flop-flops 62 with the output of PWM unit 23. Inverters 66 and D flip-flops 68 provide positive and negative phase values, with one of them being modulated by the signal from PWM 23.

Figure 7:
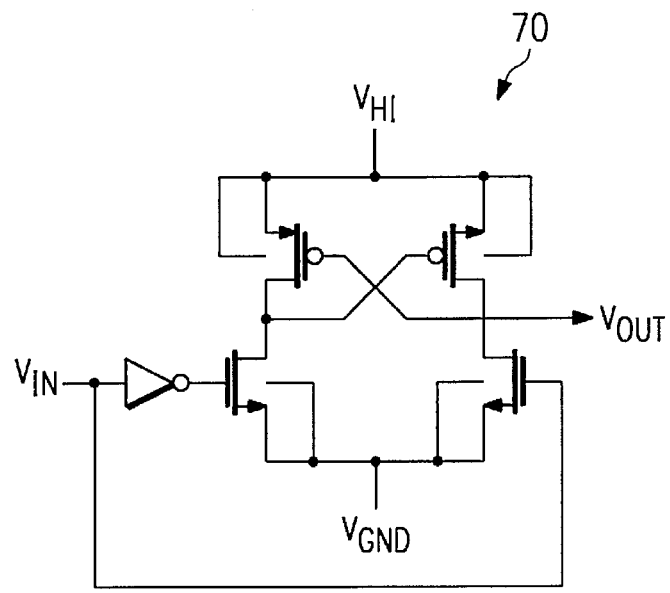
FIG. 7 illustrates a level shifter that may be used at the inputs to the drive stage of FIG. 2.
Figure 8:
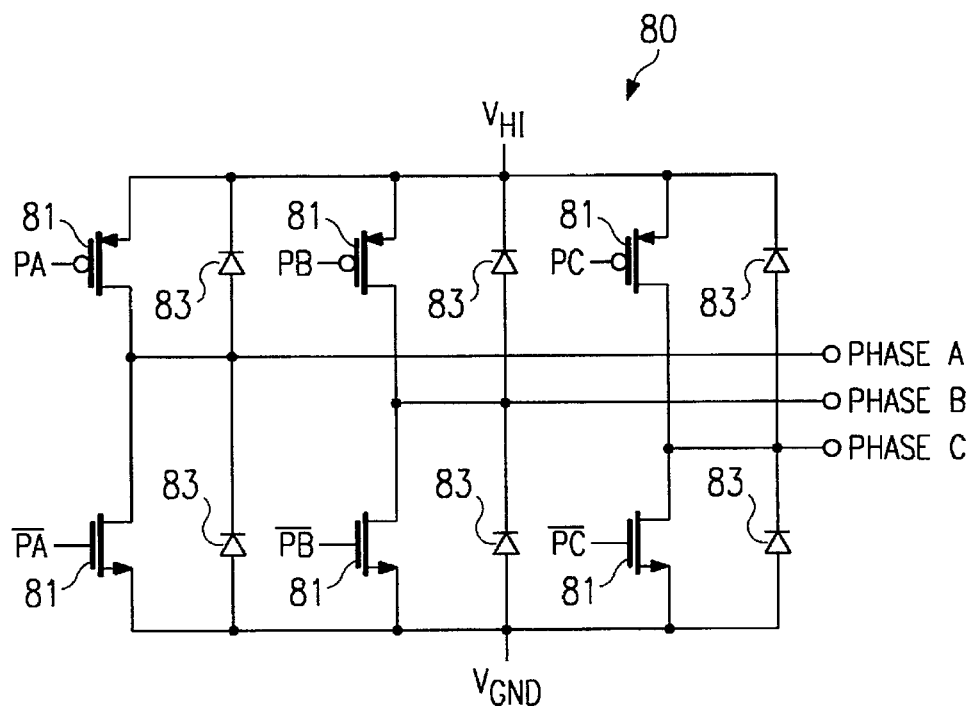
FIG. 8 illustrates a power amplifier circuit for the drive stage of FIG. 2.

Drive stage 27 performs conventional brushless DC motor drive functions. It includes power amplifiers that handle the motor currents, and may include level shifters. FIG. 7 illustrates a level shifter 70 that may be interposed on each signal path. FIG. 8 illustrates one embodiment of a power amplifier circuit 80. Field effect transistors 81 provide power amplification, and diodes 83 control back emf.

Single Chip Implementation

A feature of the invention is that it can be manufactured using integrated circuit techniques, as a single chip. A manufacturing technique known as the "PRISM" process, developed by Texas Instruments Incorporated, may be used to integrate the logic circuit of the motor controller 17 with its drive circuits. The result is the ability to provide the required current output, e.g., up to 2 amperes, from a circuit that also performs the logical functions to regulate the output.

Other Embodiments.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A digital motor controller for controlling the speed and phase of a color wheel driven by a brushless DC motor, comprising:

a digital error detection unit for receiving a phase feedback signal representing an index of the time when said color wheel is at a known position and determining a phase error value based on said phase feedback signal, and for receiving a speed feedback signal and determining a speed error value based on said speed feedback signal;

an error logic unit comprised of logic devices for implementing a feed forward function for calculating a speed control value based on said phase error value or said speed error value;

a digital pulse width modulation unit for generating a modulation signal based on said speed control value; and a commutation logic unit for modulating the pulse width of a drive signal to said motor in accordance with said modulation signal.

2. The controller of claim 1, wherein said error detection unit has a counter for determining a phase difference between said index signal and a reference signal.

3. The controller of claim 1, wherein said speed feedback signal is the index signal representing the time when said color wheel is at a known position during its revolutions, and wherein said error detection unit determines said speed error value by comparing the period of said index signal to the period of a reference signal.

4. The controller of claim 1, wherein said speed feedback signal is obtained by detecting back emf of said motor, and wherein said error detection unit determines said speed error value by comparing the period of said index signal to the period of a reference signal.

5. The controller of claim 1, wherein said feed forward function is based on a current and a past error value.

6. The controller of claim 1, wherein said feed forward function is based on a past speed control value.

7. The controller of claim 1, wherein said error value represents an increment of the period of said drive signals, and wherein said speed control value represents a duty cycle of said drive signals.

8. The controller of claim 1, wherein said error logic unit implements said feed forward function based upon constants related to the load of said motor.

9. The controller of claim 1, wherein said pulse width modulation unit has a counter for counting increments of a motor drive signal period and a comparator for comparing said speed control value with the output of said counter.

10. The controller of claim 1, wherein said motor is a multi-phase motor, and further comprising a digital drive stage for delivering said drive signal to an appropriate drive line of said motor.

11. A method of controlling the speed and phase of a color wheel driven with a brushless DC motor, comprising the steps of:

receiving phase feedback in the form of a pulse signal from said color wheel that indicates the time when said color wheel is at a known position;

using digital logic to determine the time difference between a pulse of said pulse signal and a reference pulse, thereby determining a phase error value;

receiving speed feedback in the form of a pulse signal that indicates the revolution period of said color wheel;

using digital logic to determine the time difference between a period of said speed feedback signal to a reference period, thereby determining a speed error value;

using digital logic to determine a speed control value, based on said phase error value or said speed error value, said speed control value representing a duty cycle of a drive signal of said motor; and, pulse width modulating a drive signal to said motor based on said speed control value, using a digital pulse width modulation unit.

12. The method of claim 11, wherein said step of receiving speed feedback is performed with the same signal used for said step of receiving phase feedback.

13. The method of claim 11, wherein said step of using digital logic to determine a speed control value is performed with a feed forward algorithm, based on a past and present phase error value or speed error value.

14. The method of claim 11, wherein said step of using digital logic to determine a speed control value is performed with a feed forward algorithm that includes factors representing a least one constant determined by the load on said motor.

* * * * *